United States Patent [19]
Marinkovic

[11] Patent Number: 5,934,144
[45] Date of Patent: Aug. 10, 1999

[54] SPLIT GEAR ASSEMBLY FOR USE IN A WORM GEAR DRIVE

[75] Inventor: Sinisa V. Marinkovic, Skokie, Ill.

[73] Assignee: Active Automation, Inc., Elk Grove Village, Ill.

[21] Appl. No.: 08/661,055

[22] Filed: Jun. 10, 1996

[51] Int. Cl.⁶ .................................................. F16H 55/18
[52] U.S. Cl. ................................ 74/440; 74/411; 74/445
[58] Field of Search ............................ 74/409, 411, 440, 74/445

[56] References Cited

U.S. PATENT DOCUMENTS

| | | | |
|---|---|---|---|
| 458,984 | 9/1891 | Smith | 74/440 |
| 1,404,816 | 1/1922 | Wegstein | 74/440 |
| 1,558,222 | 10/1925 | Beetow | 74/440 |
| 2,310,232 | 2/1943 | Hale | 74/440 |
| 3,127,784 | 4/1964 | O'Neill | 74/440 |
| 3,359,819 | 12/1967 | Veillette et al. | 74/411 |
| 3,535,948 | 10/1970 | Winzeler et al. | 74/440 |
| 4,263,825 | 4/1981 | Guslits | 74/127 X |
| 4,660,432 | 4/1987 | Damas | 74/440 |
| 4,663,981 | 5/1987 | Louradour et al. | 74/440 |
| 4,665,765 | 5/1987 | Heine | 74/458 |
| 4,679,458 | 7/1987 | Brandenstein et al. | 74/458 |
| 4,739,670 | 4/1988 | Tomita et al. | 74/409 |
| 4,745,823 | 5/1988 | Morita et al. | 74/409 |
| 4,790,203 | 12/1988 | Brandenstein et al. | 74/424.8 R |
| 4,986,400 | 1/1991 | Heller | 192/26 |
| 4,993,124 | 2/1991 | Ouimet | 24/274 |
| 5,186,068 | 2/1993 | Heller | 74/425 |

*Primary Examiner*—John A. Jeffery
*Assistant Examiner*—David Fenstermacher
*Attorney, Agent, or Firm*—Olson & Hierl, Ltd.

[57] ABSTRACT

An assembly suitable for preventing and/or effectively dampening the presence of backlash within a worm gear type drive is described. The assembly includes a drive gear adapted to be mounted on a shaft. The drive gear has an annular body with a plurality of teeth extending radially outwardly therefrom. The assembly also includes an offsetable secondary gear mounted to the drive gear. The secondary gear has a complementary annular body with a plurality of teeth extending radially outwardly therefrom. The teeth on the drive gear are equal in number and pitch to the teeth on the secondary gear. The teeth on the drive gear and the secondary gear, together form an array of expandable teeth having a variable thickness. Operatively connected to the drive gear and to the secondary gear is a biasing means for expanding the variable thickness of each expandable tooth.

11 Claims, 4 Drawing Sheets

SPLIT GEAR ASSEMBLY FOR USE IN A WORM GEAR DRIVE

FIELD OF THE INVENTION

The present invention relates to worm gear drives, and in particular to a split gear assembly which meshes with the threads of a worm such that any backlash between the worm and the gear assembly is eliminated or at least substantially dampened.

BACKGROUND OF THE INVENTION

Worm gear drives are used for transmitting power from an input shaft to an output shaft which are non-intersecting and typically disposed at a right angle to each other. As known in the art, worm gear drives include a toothed gear, which is attached to the output shaft, and a threaded worm mounted onto the input shaft. Correspondingly, the gear teeth mesh with the worm threads in predominately a sliding manner.

Worm gear drives are advantageous over other drive methods because of their conjugate tooth action, arrangement, compactness, and load capacity. Correspondingly, worm gear drives are used in applications where heavy shock loading can be encountered and a high degree of precision power transfer is desired.

The mesh between the gear teeth and the worm threads must be carefully designed, manufactured, and maintained in order to yield a constant output speed between the input shaft and the output shaft. Backlash, also know as "play," occurs when some or all of the gear teeth do not perfectly mesh with the worm threads. Stated in other terms, backlash is the amount by which the width between the worm threads exceeds the thickness of an engaging gear tooth. Correspondingly, the amount of exhibited backlash may vary substantially as various teeth on the gear are moved into engagement with the threads on the worm.

Backlash can be caused by a poor initial design, inaccurate machining, improper assembly, or normal wear between the worm threads and the gear teeth. However, as indicated previously, backlash must be minimized if a high degree of precision is desired between the output shaft and the input shaft.

Accordingly, many designs have been offered for reducing backlash by making periodic adjustments to diminish the gap between the intermeshing gear teeth and worm threads. However, these periodic adjustments are only made when the amount of backlash exceeds a predetermined tolerance level. Correspondingly, between each adjustment period, backlash below the maximum tolerance level is allowed to persist.

In addition, any adjustments to reduce backlash must be performed manually. The adjustments are made after the worm gear drive has been taken out of service or, during service, but only if the drive is equipped with a specially designed input shaft that allows for axially repositioning while in use.

Furthermore, none of the present worm gear designs can effectively eliminate backlash if the teeth on the gear vary in thickness. Instead, the prior gear designs are only capable of ensuring that no gap exists when the thickest gear tooth is engaged by the threads of the worm. Therefore, backlash still exists as narrower gear teeth are engaged by the worm threads.

Correspondingly, the present invention provides a device which overcomes the above-discussed problems by eliminating or substantially dampening the presence of backlash within a worm gear drive as gear teeth are engaged by the worm threads.

SUMMARY OF THE INVENTION

The present invention provides a split gear assembly for preventing or effectively dampening the presence of backlash within a worm gear type drive.

The structure embodying the present invention is especially suitable for transferring power to an output shaft which is positioned at a right angle to an input shaft. The apparatus provides for a precision rotational response between the output shaft and the input shaft. Furthermore, adjustments are continuously made to eliminate the undesirable effects of backlash as power is being transferred and shock loading is encountered.

The split gear assembly embodying the present invention includes a drive gear adapted to be mounted on a shaft and an offsetable secondary gear mounted to the drive gear. The drive gear has an annular body with a plurality of teeth which radially extend outwardly from the annular body. The offsetable secondary gear is juxtaposed to the drive gear and has an annular body with a plurality of teeth radially extending outwardly therefrom. The teeth on the secondary gear are the same as the teeth on the drive gear. The teeth on the drive gear and the secondary gear, together, form an array of expandable teeth having a variable teeth thickness. Operatively connected to the primary or drive gear and the secondary gear is a biasing means for resiliently expanding the thickness of each expandable tooth so as to occupy the full width of the worm thread engaged therewith.

BRIEF DESCRIPTION OF THE DRAWINGS

In the accompanying drawings that form part of the specification, and in which like numerals are employed to designate like parts throughout the same.

DESCRIPTION OF THE PREFERRED EMBODIMENTS

A split gear assembly embodying the present invention reduces or eliminates the undesirable effects of backlash in a worm gear drive. The split gear assembly embodying the present invention includes a drive gear and a secondary gear adapted to be carried on the same output shaft and recoilably mounted with respect to the drive gear. The drive gear has an annular body with a plurality of teeth radially extending outwardly therefrom. Positioned adjacent to the drive gear is an offsetable secondary gear which has an annular body with a plurality of teeth radially extending outwardly from the annular body. The teeth on the secondary gear and the drive gear are the same in number and pitch, and form an array of teeth having an expandable thickness. A biasing means is operatively interconnected between the drive gear and the secondary gear for resiliently varying the thickness of the expandable teeth.

Figure 1:
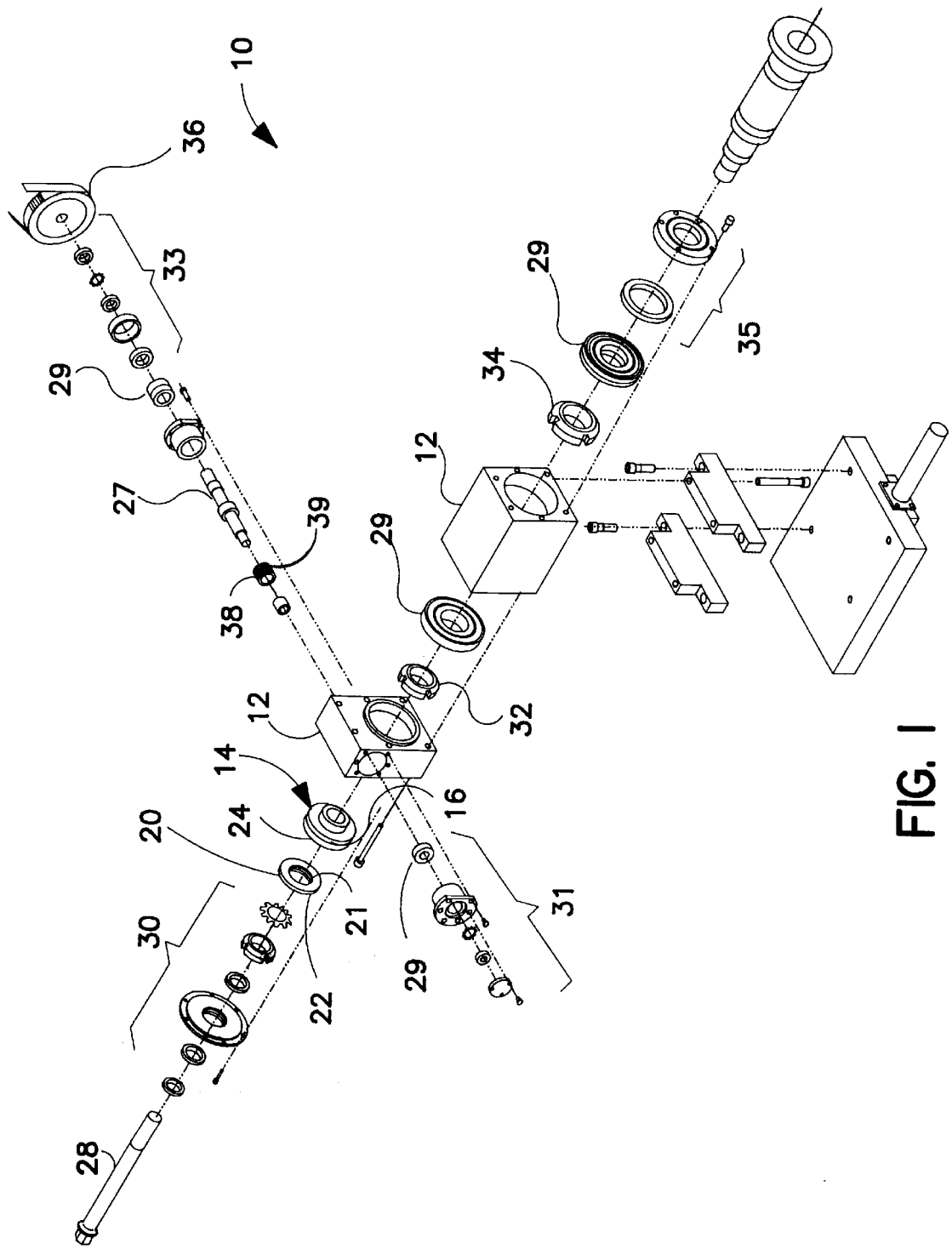
FIG. 1 is a perspective view of a drive transfer assembly having a split gear assembly in accordance with the present invention.
Figure 2:
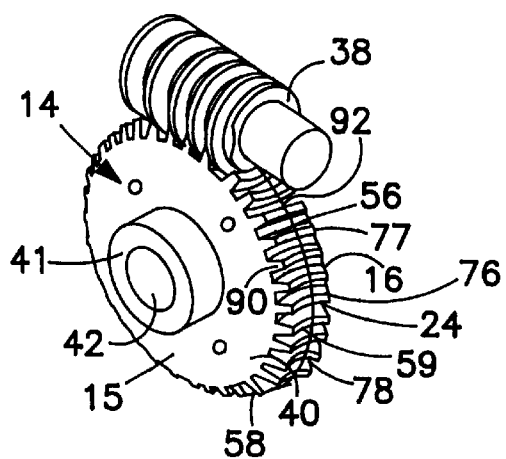
FIG. 2 is a perspective view of a worm gear in mesh with a split gear assembly embodying the present invention and having a drive gear and a coacting, offsetable secondary gear.
Figure 3:
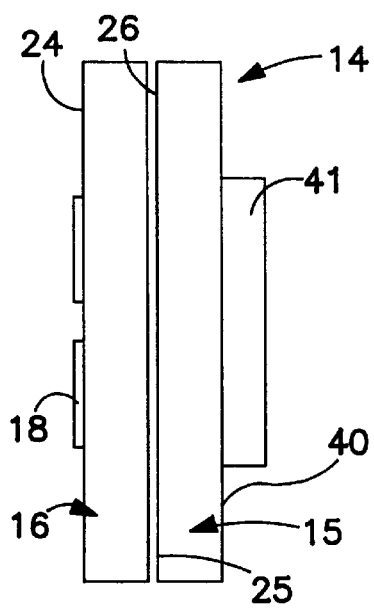
FIG. 3 is a plan view of the split gear assembly depicted in FIG. 2.

Referring to the drawings, and particularly to FIGS. 1, 2, and 3, a drive transfer assembly 10 is depicted having a conventional worm gear drive housing 12 and includes a split gear assembly 14 with drive gear 15 and offsetable secondary gear 16. The split gear assembly 14, the drive gear 15 and an offsetable secondary gear 16 are juxtaposed.

The secondary gear 16 is maintained on the hub 18 of the drive gear 15 by a keeper 20 having a cylindrical sleeve 21 with a flange 22 radially outwardly extending around an end of the sleeve. The keeper sleeve 21 is pressed onto the portion of the drive gear hub 18 which perpendicularly protrudes from the outer side 24 of the secondary gear 16 such that the keeper flange 22 adjoins against the outer side of the secondary gear. Therefore, the secondary gear 16 is rotatably mounted on the drive gear hub 18 with the inner side 25 and the outer side 24 of the secondary gear 16 sliding against the drive gear inner side 26 and the keeper flange 22, respectively.

Correspondingly, an input shaft 27 and an output shaft 28 protrude from the housing 12 at a right angle to each other. Support bearings 29 and other customary retaining means 30,31,32,33,34, and 35 such as washers, nuts, and seals are used to position each shaft 27,28 within the housing 12 such that the shafts can be rotated, but axial and radial movement is prevented.

Input shaft 27 is connected to a drive 36 for rotating the shaft. Keyed onto the input shaft 27 is a worm 38 formed of material such as hardened steel and having V-type screw threads 39 along its outer surface. Keyed onto the output shaft 28 is the split gear assembly 14.

Figure 4:
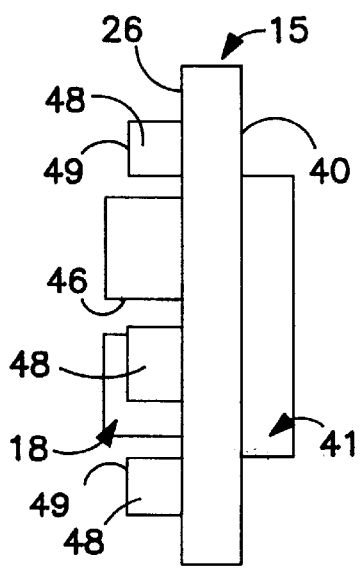
FIG. 4 is similar to FIG. 3, but with the offsetable gear removed.
Figure 5:
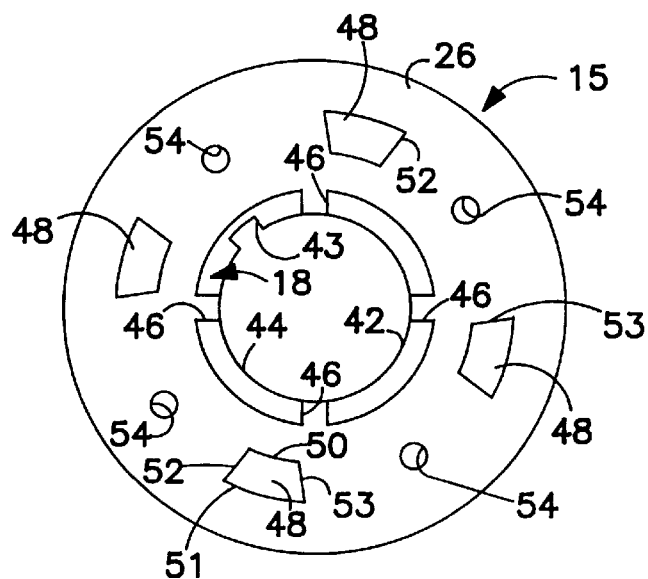
FIG. 5 is a side view of the drive gear depicted in FIG. 4.
Figure 6:
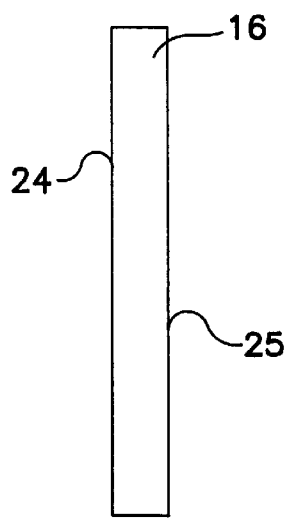
FIG. 6 provides a plan view of the offsetable gear illustrated in FIG. 3.

As shown in FIGS. 3, 4 and 5, the drive gear 15 is generally annular in shape with a disk shaped outer side 40 and an opposite inner side 26. The drive gear 15 can be made of metal or a suitable metal alloy such as bronze.

The drive gear 15 includes an integral collar 41 on outer side 40 and hub 18 on inner side 26. The collar 41 is cylindrically shaped, positioned around the center of the gear, and projects perpendicularly away from the gear outer side 40. Likewise, the hub 18 is generally tubular in shape, surrounds the center of the gear, and outwardly protrudes from the gear inner side 26.

As further illustrated by FIG. 5, extending through the center of the drive gear 15, collar 41, and hub 18, is a generally cylindrically shaped open bore 42 for receiving the output shaft. Spanning the length of the bore 42 and in communication therewith is an elongated channel 43. The channel 43 provides for keying the drive gear 15 onto the output shaft.

The hub 18 of the drive gear 15 is formed by four walls 44 which protrude from the inner side 26 of the gear and are outwardly bowed around the bore 42. Between each of the walls 44 is one of four slots 46. Furthermore, as indicated previously, the channel 43 for keying the drive gear 15 onto the output shaft 28 extends along one of the four walls 44.

Also projecting perpendicularly from the inner side 26 of the drive gear 15 are four symmetrically shaped guideposts 48. The posts 48 are integral to the drive gear 15 and positioned radially outwardly from the center of the gear.

Each post 48 has a proximal end, a distal end 49, and four sides 50, 51, 52, and 53. In addition, each post 48 is bowed such that side 50 is concave and faces the center of the gear. In contrast, opposing side 51 is convex and faces the outer rim of the gear. Furthermore, side 52 is planar to the center of the drive gear, and side 53 faces slightly inwardly towards the gear center.

Radially outwardly disposed from the center of the drive gear 15 are four open holes 54 with one hole being located between each of the guideposts 48. Each hole is cylindrically shaped and extends from the inner side 26 of the drive gear 15 to the outer side 40. The holes 54 and the guideposts 48 form generally a circular configuration on the inner side 26 of the drive gear 15 which uniformly surrounds the bore 42. The holes 54 are symmetrically located around the inner side 26 of the drive gear 15 such that each hole 54 is positioned closer to side 53 of a guidepost 48 than to side 52.

Figure 9:
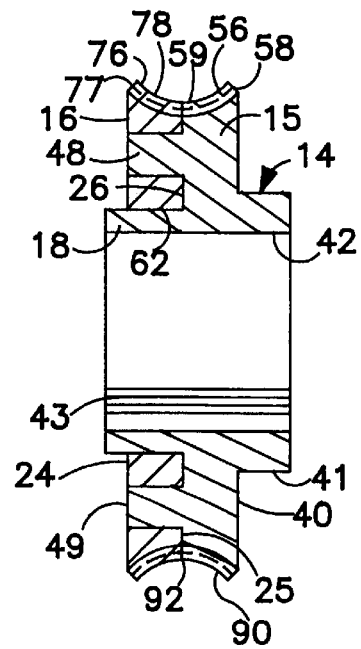
FIG. 9 is a cross-section plan view of the split gear assembly within FIG. 8, taken along line 9—9.
Figure 10:
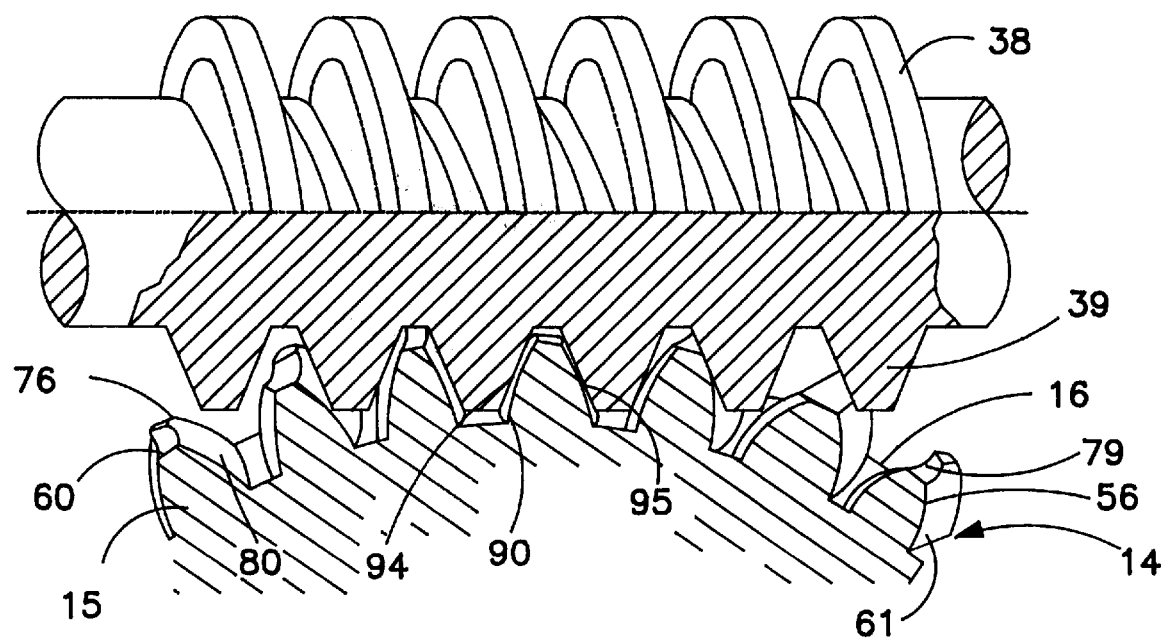
FIG. 10 is a partial fragmentary side view of the mesh between the worm and split gear assembly depicted in FIG. 2.

As shown in FIGS. 2, 9, and 10, radially outwardly extending around the periphery of the drive gear 15 are a plurality of teeth 56. Each tooth 56 extends from the outer side 40 of the gear 15 to the inner side 26 and is generally V-shaped in cross-section. Each tooth has a beveled portion 58 and a curved portion 59. The beveled portion 58 is straight and extends from the outer side 40 of the drive gear 15 and towards the inner side 26. Conversely, the curved portion 59 has a generally concave involute shape and extends from the inner side 26 of the gear to adjoin with the beveled portion 58.

In cross-section, as shown in FIG. 10, the distal end 60 of each tooth 56 is planar. Furthermore, each side 61 of each generally V-shaped tooth 56 is outwardly bowed.

As illustrated by FIGS. 2, 3, 8, and 9, rotatably mounted on the hub 18 of the drive gear 15 is the offsetable secondary gear 16. The secondary gear 16 is generally annular in shape with a round outer side 24 and an opposite planar inner side 25. The secondary gear 16 can be made of metal or a suitable metal alloy such as bronze. Furthermore, the secondary gear 16 has the same diameter as the drive gear 15.

Extending from the outer side 24 of the secondary gear 16 to the inner side 25 is a cylindrically shaped open aperture 62. The aperture 62 has a larger diameter than the outer diameter of the drive gear hub 18. The aperture 62 receives the hub 18 of the drive gear 36 such that the hub 18 perpendicularly protrudes from the outer side 24 of the secondary gear 16. Correspondingly, as shown in FIGS. 2, 3, 9, and 10, the inner side 26 of the drive gear 15 abuts against the inner side 25 of the secondary gear 16.

Figure 7:
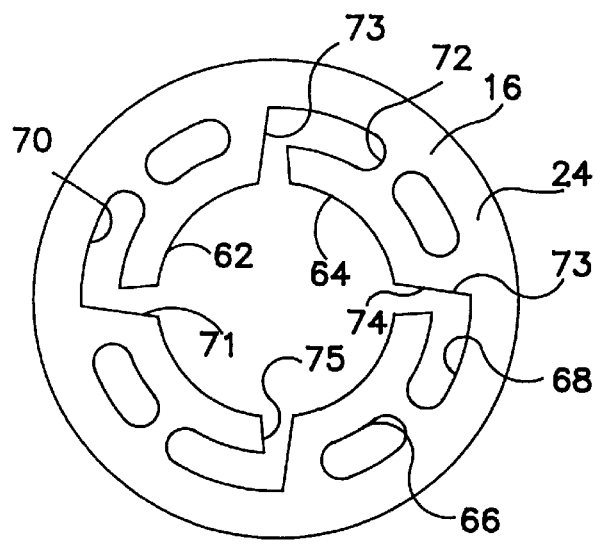
FIG. 7 is a side view of the secondary gear shown in FIG. 6.
Figure 8:
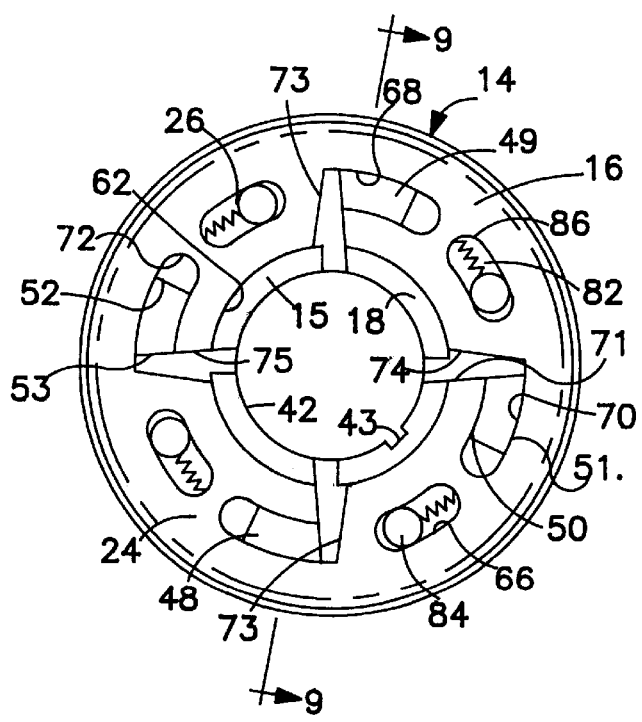
FIG. 8 is a side view of the split gear assembly illustrated in FIGS. 1–3.

Turning to FIGS. 7, 8, and 9, extending through the secondary gear 16 are four elongated symmetrical slots 66 which are radially outwardly disposed from the center of the secondary gear. Each slot 66 passes from the inner side 25 of the secondary gear to the outer side 24. Furthermore, each slot 66 defines a segmental arc having a curvature which is equal to the curvature of the aperture wall 64.

Likewise, situated generally between each of the elongated slots 66 is an open guide passage 68 which extends from the inner side 25 of the secondary gear 16 to the outer side 24. The four symmetrical guide passages 68 are radially outwardly disposed from the center of the secondary gear 16 with each passage having a curved portion 70 and a neck portion 71.

The ends 72 and 73 of each curved portion 70 are semicircular and planar, respectively. Each curved portion 70 is symmetrically positioned within the gear 16 such that a semicircular end 72 of one guide passage 68 is adjacent to the planar end 73 of another guide passage.

Furthermore, the curved portion 70 of each passage is arched such that it has generally the same curvature as the aperture wall 64 of the secondary gear 16. The slots 66 and the curved portion 70 of the guide passages 68 form a circular configuration on the sides 24,25 of the secondary gear 16 and symmetrically around the aperture 62.

As indicated previously, the curved portion 70 within each guide passage 68 is in communication with the neck portion 71. The neck portion 71 of each guide passage 68 has two walls 74,75 which uniformly diverge away from the center of the gear 16. Each neck portion 71 also extends to, and is in communication with, the gear center aperture 62. Furthermore, within each guide passage 68, neck wall 74 is planar with end wall 73.

As best seen in FIGS. 2, 9, and 10, radially outwardly extending around the periphery of the secondary gear 16 are a plurality of teeth 76 which are equal in number and symmetrical to the teeth 56 on the drive gear 15. Correspondingly, each tooth 76 on the secondary gear 16 extends from the outer side 24 of the gear 16 to the inner side 25. In addition, each tooth has a beveled portion 77 and a curved portion 78. The beveled portion 77 is linear and projects from the outer side 24 of the secondary gear 16 and inwardly towards the inner side 25. In contrast, the curved portion 78 has a generally concave involute shape which extends from the beveled portion 77 of the gear 16 to the inner side 25.

Furthermore, each tooth 76 on the secondary gear 16 has a cross-sectional profile which is generally V-shaped. However, the terminal end 79 of each tooth 76 is planar and each side 80 is slightly outwardly curved.

As stated previously, the secondary gear 16 is rotatably mounted onto the hub 18 of the drive gear 15. The offsetable secondary gear 16 is mounted such that its inner side 25 adjoins against the inner side 26 of the drive gear 15.

As illustrated by FIGS. 8 and 9, each guidepost 48 on the drive gear 15 slides within a corresponding guide passage curved portion 70 within the secondary gear 16. The sides 50 and 51 of each guidepost 48 slidingly adjoin against the secondary gear 16. In addition, the distal end 49 of each guidepost 48 is planar with the outer side 24 of the secondary gear 15.

Rotation of the secondary gear 16, with respect to the drive gear 15, is limited since a guidepost 48 occupies the curved portion 70 of each guide passage 68. Therefore, rotation is halted when either end 72,73 of each guide passage 68 abuts against the guidepost 48 within the passage.

Referring to FIG. 8, clockwise rotation of the secondary gear 16 is stopped as each of the four ends 73 of the secondary gear abut against one of four guideposts 48 extending from the drive gear 15. Likewise, counterclockwise rotation is stopped as each of the four semicircular ends 72 of the secondary gear 16 contact one of the four guideposts 48 of the drive gear 15. The contact within each guide passage 68 occurs when the semicircular end 72 of the secondary gear 16 encounters the wider planar side 52 of the guidepost 48.

Contained within each slot 66 within the secondary gear 16 is a spring 82 which has one end attached to the drive gear 15 and the other end 86 abutting against the secondary gear 16. Each spring 82 is attached to the drive gear 15 by a rivet 84. Each rivet 84 extends through one of the holes 54 in the drive gear 15.

The springs 82 are symmetrically positioned within the drive transfer assembly 14 such that the abutting end 86 of each spring projects towards the planar side 52 of an adjacent guidepost 48. Therefore, all of the springs 82 are forcibly compressed as the secondary gear 16 is rotated clockwise with respect to the drive gear 15.

As depicted by FIGS. 2, 9, and 10, the drive gear teeth 56 and the secondary gear teeth 76 can be aligned with each other to form a plurality of expandable teeth 90. During alignment, the springs 82 are compressed. In addition, each expandable tooth 90 extends from the outer side 40 of the drive gear 15 to the outer side 24 of the secondary gear 16. Each expandable tooth 90 is generally involute with a bottom 92 where the drive gear tooth 56 adjoins the secondary gear tooth 76.

The split gear assembly 10 is shown in mesh with the worm 38. The expandable teeth 90 mesh with the V-type screw threads 39 of the worm 38 such that at least one expandable tooth is continuously engaged within the worm threads.

As each expandable tooth 90 comes into mesh with the worm threads, the tooth occupying the smallest width between the sides 94 and 95 of the worm threads will resiliently press against the worm threads. The tooth 90 is fully expanded by the springs 82 which recoilably position the secondary gear 16 with respect to the drive gear 15. Thus, the springs 82 bias actuate the drive gear 15 and the secondary gear 16 in opposite directions from each other for fully expanding the teeth 56 and 76 of the drive gear and the secondary gear, respectively.

Correspondingly, the drive gear tooth 56 and the offsetable gear tooth 76 of the expandable tooth 90 are pressed against opposite facing sides 94 and 95 of the worm threads. Therefore, backlash is eliminated or substantially dampened because of the continued pressing by at least one expandable tooth 90 against opposite facing sides 94 and 95 of the worm threads.

It will be readily apparent from the foregoing detailed description of the invention and from the illustrations thereof that numerous variations and modifications may be effected without departing from the true spirit and scope of the novel concepts or principles of this invention.

I claim:

1. A split gear assembly for mounting onto a shaft, said split gear assembly comprising:
   (a) a drive gear having a hub adapted to receive said shaft, said drive gear having an annular body with an array of peripheral teeth extending radially outwardly therefrom, said annular body having an inner side with at least one rigid pin perpendicularly extending therefrom;
   (b) a secondary gear rotatably mounted on said hub and having an annular body with an array of peripheral teeth extending radially outwardly therefrom, a planar inner side surface slidingly abutting said drive gear and a slot receiving at least one said pin, said teeth on said secondary gear being the same in number and pitch as said teeth on said drive gear, and said teeth on said drive gear and said secondary gear together forming a plurality of expandable gear teeth; and
   (c) a bias actuator operatively connected to said drive gear and said secondary gear for resiliently expanding thickness of each of said expandable gear teeth;
   said bias actuator including a spring operatively connected to said drive gear and said secondary gear and said spring being attached to said drive gear by a rivet.

2. The split gear assembly of claim 1, wherein each of said teeth on said drive gear has a curved portion.

3. The split gear assembly of claim 2, wherein said curved portion is involute.

4. The split gear assembly of claim 2, wherein said teeth on said drive gear and said teeth on said secondary gear are symmetrical to one another.

5. The split gear assembly of claim 1, wherein said shaft is positioned at a right angle to an input shaft.

6. A worm gear drive comprising:

(a) a worm mounted onto an input shaft and having a threaded outer surface with opposite facing sides;

(b) a drive gear having a hub for receiving an output shaft and an annular body with teeth outwardly extending therefrom and in mesh with said threaded outer surface;

(c) a secondary gear having an aperture for receiving said hub and having teeth outwardly extending therefrom and in mesh with said threaded outer surface; and (d) an expansion actuator operatively connected to said drive gear and said secondary gear for resiliently pressing said teeth of said drive gear and said teeth of said secondary gear in mesh with said threaded outer surface against said opposite sides of said threaded outer surface, said expansion actuator including a spring operatively connected to said drive gear and said secondary gear wherein said spring is attached to said drive gear by a rivet.

7. The worm gear drive of claim 6, wherein said teeth on said drive gear have a curved portion.

8. The worm gear drive of claim 7, wherein said curved portion is involute.

9. The worm gear drive of claim 8, wherein said teeth on said drive gear are symmetrical to said teeth on said secondary gear.

10. The worm gear drive of claim 6, wherein said secondary gear is rotatably mounted to said drive gear.

11. The worm gear drive of claim 6, wherein said input shaft and said output shaft are positioned at about a right angle to each other.

* * * * *